(12) United States Patent
Mammou et al.

(10) Patent No.: US 10,712,565 B2
(45) Date of Patent: Jul. 14, 2020

(54) METHOD AND SYSTEM FOR STREAMING INFORMATION IN WIRELESS VIRTUAL REALITY

(71) Applicants: Advanced Micro Devices, Inc., Santa Clara, CA (US); ATI Technologies ULC, Markham (CA)

(72) Inventors: Khaled Mammou, Vancouver (CA); Layla A. Mah, Lowell, MA (US)

(73) Assignees: Advanced Micro Devices, Inc., Santa Clara, CA (US); ATI Technologies ULC, Markham, Ontario (CA)

(*) Notice: Subject to any disclaimer, the term of this patent is extended or adjusted under 35 U.S.C. 154(b) by 0 days.

(21) Appl. No.: 16/426,898

(22) Filed: May 30, 2019

(65) Prior Publication Data

US 2019/0278083 A1 Sep. 12, 2019

Related U.S. Application Data

(62) Division of application No. 15/040,131, filed on Feb. 10, 2016, now Pat. No. 10,310,266.

(51) Int. Cl.
*G02B 27/01* (2006.01)
*H04W 28/02* (2009.01)
*G06F 3/01* (2006.01)
*H04L 29/06* (2006.01)

(52) U.S. Cl.
CPC ............ *G02B 27/017* (2013.01); *G06F 3/011* (2013.01); *G06F 3/012* (2013.01); *H04L 65/60* (2013.01); *H04L 65/607* (2013.01); *H04L 65/80* (2013.01); *H04L 67/38* (2013.01); *H04W 28/0236* (2013.01)

(58) Field of Classification Search
CPC ..................................................... G02B 27/017
USPC ........................................................... 345/426
See application file for complete search history.

(56) References Cited

U.S. PATENT DOCUMENTS

| | | | |
|---|---|---|---|
| 2010/0063992 A1* | 3/2010 | Ma ........................ | G06T 15/005 709/203 |
| 2011/0244956 A1 | 10/2011 | Sakakibara et al. | |
| 2013/0344966 A1* | 12/2013 | Mustafa .................. | A63F 13/12 463/42 |
| 2014/0375634 A1 | 12/2014 | Hillesland et al. | |
| 2015/0097719 A1 | 4/2015 | Balachandreswaran et al. | |
| 2017/0003750 A1 | 1/2017 | Li | |
| 2017/0078447 A1 | 3/2017 | Hancock et al. | |

OTHER PUBLICATIONS

Hering, Nils et al. "3DCIS: A Real-time Browser-rendered 3D Campus Information System Based on WebGL." (2011) (Year: 2011).*

(Continued)

*Primary Examiner* — Shivang I Patel
(74) *Attorney, Agent, or Firm* — Volpe and Koenig, P.C.

(57) ABSTRACT

Described is a method and system to efficiently compress and stream texture-space rendered content that enables low latency wireless virtual reality applications. In particular, camera motion, object motion/deformation, and shading information are decoupled and each type of information is then compressed as needed and streamed separately, while taking into account its tolerance to delays.

25 Claims, 5 Drawing Sheets

(56) References Cited

OTHER PUBLICATIONS

Preda, M. et al, "Critic review on MPEG-4 face and body animation", Proceedings of the International Conference on Image Processing (ICIP '02), Jun. 24-28, 2002, p. 505-508, vol. 3, IEEE, Rochester, NY, USA.

Mamou, K. et al, "TFAN: A Low Complexity 3D Mesh Compression Algorithm", Computer Animation and Virtual Worlds, Jun. 11, 2009, p. 343-354, vol. 20, Issue 2-3, John Wiley and Sons Ltd. Chichester, UK.

Mamou, K. et al, "Frame-based compression of animated meshes in MPEG-4", IEEE Conference on Multimedia and Expo (ICME '08), Jun. 23-26, 2008, p. 1121-1124, IEEE, Hannover, Germany.

Herin, Nils et al. "3DCIS: A Real-time Browser-rendered 3D Campus Information System Based on WebGL." (2011).

\* cited by examiner

METHOD AND SYSTEM FOR STREAMING INFORMATION IN WIRELESS VIRTUAL REALITY

CROSS REFERENCE TO RELATED APPLICATION

This application is a division of U.S. patent application Ser. No. 15/040,131, filed Feb. 10, 2016, which is incorporated by reference as if fully set forth.

FIELD OF INVENTION

The disclosed embodiments are generally directed to graphics rendering, and in particular, to 3D graphics rendering in wireless virtual reality systems.

BACKGROUND

Virtual Reality (VR) systems use a wired connection between a rendering engine and a Head Mounted Device (HMD) in order to guarantee efficient and reliable transfer of rendered frames. Wired connections offer the advantages of high bandwidth and reliable transmission. However, it obviously limits the mobility of the user. Wireless VR systems aim to replace the wired connection with a wireless one, (e.g., WiFi). Due to the limited bandwidth of wireless connections as compared to wired connections, highly efficient low latency compression is critical for enabling wireless VR systems.

Compression is important since rendering can involve large amounts of computation. For certain real-time applications, such as VR applications, video games, simulations, and the like, rendering needs to occur at very fast speeds. Applications may need to maintain the latency between a user input and the rendering of the corresponding graphics within a certain tolerance. For example, a high rendering latency in response to a user input in a VR application can lead to degraded visual acuity and performance. These breaks in perceived presence, in turn, may lead to motion sickness, for example.

The advancement in networking and increased bandwidth have allowed for the possibility of offloading rendering computations from client devices to remote servers, which can stream rendered graphics to the client. Under such a rendering scheme, a client may transmit input commands over a network and a server can perform rendering of a scene based on the input and transmit the rendered scene back to the client. However, even with increased network bandwidth, maintaining low latency remains challenging.

SUMMARY

Described is a method and system to efficiently compress and stream texture-space rendered content that enables low latency wireless virtual reality applications. In particular, camera motion, object motion/deformation, and shading information are decoupled and each type of information is then compressed as needed and streamed separately, while taking into account its tolerance to delays.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

In general, a method and system is described that efficiently processes texture-space rendered content in a wireless virtual reality (VR) environment. Scene content from the wireless VR system is decoupled into three distinct information components and each component is handled in view of its latency requirements. In particular, the three information components are camera motion, object motion/deformation, and shading information. Each information component is compressed as needed and streamed separately while taking into account user tolerance to delays.

In the typical VR system, a scene is rendered on the basis of two virtual cameras, the location of which is determined on the basis of the expected location of the center of the user's eyes. The system allows the user to perceive a 3D view by presenting different information to the left and right eyes. That is, the scene rendered for the right virtual camera is presented to the right eye and the scene rendered for the left virtual camera is presented to the left eye. Each rendered view is slightly different and has a different perspective. A head mounted device (HMD) typically has sensors that capture head/camera motion. The system then applies the motion data to the scene, re-renders the scene and presents the new scene at the HMD. This process has to be done fast so that the user's mind believes that they are in the 3D world. For example, a nominal latency period between the motion and the re-rendered scene may be 10-15 milliseconds. If the latency is greater than 10-15 milliseconds, the user may experience motion sickness. Non-wireless VR systems use a cable to connect the HMD to the server but this obviously limits the user's mobility and freedom. Consequently, a wireless connection between the HMD and server is preferred. The wireless connection, however, introduces a myriad of issues including bandwidth, compression and latency.

Figure 1:
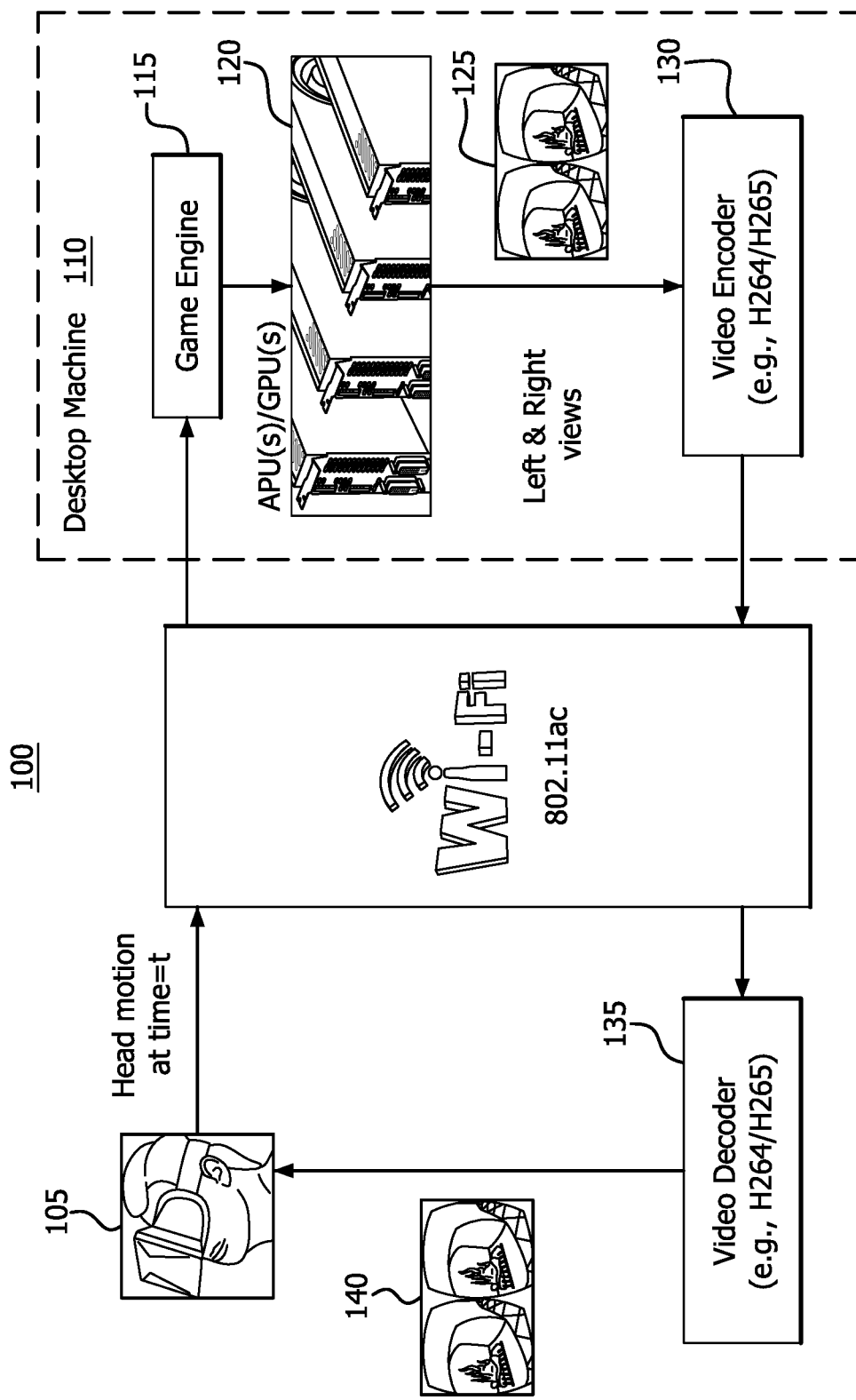
FIG. 1 is a standard wireless virtual reality (VR) system.
Figure 2:
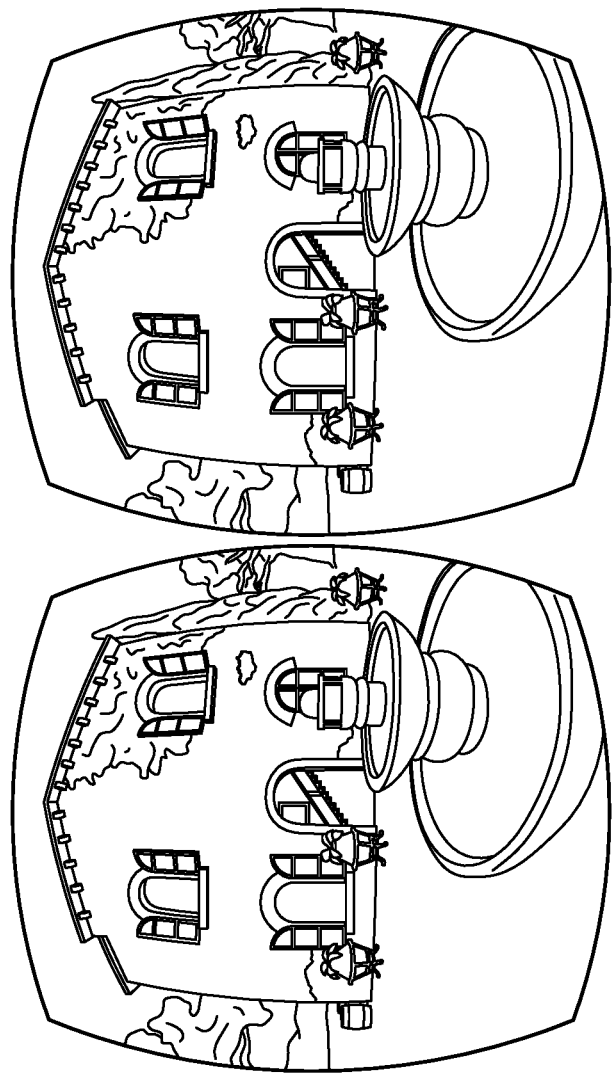
FIG. 2 are examples of standard rendered left and right views in accordance with the system of FIG. 1.

FIG. 1, shows a typical prior art wireless VR system 100 in a client-server architecture. A HMD 105 on the client side is in wireless communications with a server 110, such as a desktop machine, using a wireless communication protocol 107, such as a WiFi connection. The server 110 may include a game engine 115 that can determine, or is provided, the location of the user's eyes based on head position and orientation data. The game engine will generate and send rendering commands to a processing system 120. The processing system 120 performs graphics operations on the scene content based on the received commands and outputs left and right views 125. The left and right views 125 are warped to compensate for lens distortions, (see warped left and right view 200 in FIG. 2), and stitched together as one picture. The stitched picture is too large to send uncompressed, so the stitched picture is fed to a video encoder 130 to generate a video stream. After encoding and compression, the generated video stream/bitstream is transferred through the WiFi connection back to the client side. A video decoder 135 decodes the video stream/bitstream and presents the stitched left and right views 140 to the HMD 105. While the traditional wireless VR system 100 offers simplicity, it usually leads to a high latency, which severely compromises the VR applications interactivity and may potentially lead to headache and motion sickness. For example, the latency in the system is the time difference between when the head motion was captured by the HMD and when the decoded video stream/bitstream is presented at the HMD. This includes the scene information going from the HMD to the graphics engine, rendering, encoding, streaming, decoding and presenting at the HMD. This latency may also be referred to as motion-to-photon latency.

The typical wireless VR system 100 takes a long time and a lot of resources to render, compress, stream, decompress, and present full-frame data, particularly stereo full-frame data. Sending full-frame data means that for stereo or holographic displays, you need to send a separate image for each projection. In particular, the rendering, encoding and decoding is done at a frame level. This means that the whole frame has to be received before any rendering, encoding and decoding can be performed. Disadvantageously, sending full-frame data means that even though most image content only changes in projection each frame, time and energy (microseconds, flops, bits and watts) is wasted in re-computing, compressing, transmitting and decoding each frame. Moreover, sending full-frame data means that the client is not tolerant to errors on the wireless network which may cause packets to be lost and arrive too late to be utilized. The dropped frames may lead to user motion sickness.

Described herein is a wireless VR system and method that overcomes at least some of the limitations discussed above by combining a texture-space rendering approach with efficient low latency compression. The texture-space rendering approach can be used to create a low-latency low-bandwidth multi-client wireless rendering system where compute heavy low/mid-frequency shading is performed in texture-space at a low rate, (e.g. 20-60 Hz), on a dedicated high-powered server. A client-server architecture can be employed as shown and discussed with respect to FIG. 3.

In general, rendering involves generating an image from a 2D or 3D model of objects by applying geometry, viewpoint, texture, lighting, and shading information to the modelled objects. The rendering also accounts for head motion, object motion, and camera perspective. As stated, a part of rendering is shading. Shading involves the application of lighting to objects. A point to note with respect to shading is that shading behaves differently based on the material that is composing the object. Two points are of note with respect to objects and object motion. When the lighting and object are fixed and only the camera moves, then the shading information does not change. When the object moves and the lighting is fixed, then the shading information changes. As a result, an object is segmented into sub-objects or patches when rendering, where each patch has its own material characteristics or properties. The rendering process is very time consuming and graphics processing units (GPUs) are often used to improve the processing for this operation.

Nominally rendering is done directly in 3D space to obtain the right and left views. However, another approach is to perform texture-space rendering. The texture-space is where a mapping of a 2D image onto a 3D surface occurs. Texture-space rendering renders or bakes the shading information into textures at the server side. That is, a client-side renderer is not required to do shading since the shading is baked into the textures received from the server-side using compressed bitstreams. The shading information can simply be re-used by the client-side as needed. Consequently, the system can process the shading information from the scene information on a patch-by-patch basis. That is, the shading, encoding, transmitting, decoding, rendering and presenting can be a pipelined process at the patch level thereby reducing latency.

As noted above, the shading information should not appreciably change when the head or camera moves. This means that the new head or camera motion may be directly applied at the client-side rendering since updated shading information is not needed. Although the client-side is now performing some rendering, the workload is reduced as no rendering has to be done with respect to the shading information.

The texture-space rendering approach enables the streaming of texture-space data to multiple clients, which can locally continuously integrate this data and synthesize screen-space projections at a much higher rate, (e.g. 60 Hz-2 KHz). The support for multiple wireless clients requires minimal bandwidth and processing overhead. A single texture-space server can stream the exact same data to all clients via an ip_multicast, for example. All clients can re-project texture-space to their respective camera locations. Stereo (or even holographic) projections can rapidly be synthesized from a single texture-space.

The texture-space rendering/shading approach amortizes shading cost over multiple frames of re-use by composition from texture space because it enables perfect handling of alpha blending, allows for per-patch, per sub-object, per-pixel or per-tile multi-rate shading, and because 8× Multi-sample anti-aliasing (MSAA) is computationally less expensive than other anti-aliasing methods such as for example, Super-Sample Anti-Aliasing.

The present approach can lower latency in comparison to the typical wireless VR system by compressing and streaming 8×8 texture-space tiles and per-object matrices rather than e.g., full 3840×2160 frames. Each tile can be rendered, compressed, streamed, decompressed and integrated in parallel with respect to all other tiles. Moreover, better positional and rotational re-projection at the display refresh rate may be provided via the display shaders.

The texture-space rendering approach has better compression efficiency since motion and shading information are decoupled. In particular, since pixel locations are static in texture space, delta compression can be used effectively.

In the texture-space rendering approach, scene content from the wireless VR system is decoupled into three information components and each information component is then encoded and streamed differently. In general, the three information components are head/camera motion, object motion/deformation, and shading information. An advantage of this decoupling is that the human visual system perceives latency differently or has different tolerance levels for each of the different types of information components.

The head/camera motion information component should have the lowest possible latency since delays between actual head motion and rendered pictures presented to the user may lead to headache and motion sickness problems. The wireless VR system can offer very low latency in reaction to head motion by rendering the scene on the client side, while exploiting the latest HMD position/orientation and set of textures sent by the server as described herein below. For example, the latency may be in the range of around 1-2 milliseconds. The head/camera motion may be updated every millisecond, for example.

The texture-space rendering approach can alleviate the client-side rendering computations by moving the heavy tasks to the server. The head motion is transferred by using a low latency non-reliable protocol such as User Datagram Protocol (UDP), although other similar protocols may be used. The head/camera motion information component could be sent either uncompressed or compressed by applying delta prediction, (which is an example of linear prediction where the predictor is the last encoded value), quantization and entropy coding to the head position (represented as a 3D vector) and orientation (represented as a quaternion). The server computes the shading information based on the latest available or predicted head/camera motion and bakes it as a set of 2D textures to be compressed and transmitted to the client-side as described herein below.

The second information component is the object motion/deformation information component. As shown below, low latency object motion/deformation updates are needed to ensure highly interactive VR applications, (e.g., collisions detection). The latency of the object is approximately 3-4 milliseconds. The object motion data may be updated periodically. The period may be, for example, 4 milliseconds. Such updates are usually described or represented using object/sub-object affine motion, skinning-based models, or dynamic geometries. Each representation method has defined ways to represent or hold the data/information and associated compression techniques/approaches that are applicable to each one of these representations. Table 1 illustrates the relationship between the representation, data and compression techniques. Specifically, the first column identifies the type of representation being used for an object, the second column identifies example data forms associated with the representations, and the third column identifies example compression techniques that may be applied to the data forms. The contents of Table 1 are merely illustrative and non-limiting examples and other representations, data and compression techniques may be equally applicable.

TABLE 1

| Representation | Data | Compression |
| --- | --- | --- |
| Object/subject affine motion | Affine transforms represented as 4 × 4 matrices Position/orientation information represented as 3D vectors and quaternions | No compressed Delta prediction + quantization + entropy encoding MPEG-BBA standard [1] |
| Skinning-based models | Animations weights | Connectivity-based prediction + quantization + entropy encoding (see MPEG-FAMC standard [2]) |
| | Affine transforms represented as 4 × 4 matrices Position/orientation information represented as 3D vectors and quaternions | No compressed Delta prediction + quantization + entropy encoding MPEG-BBA standard |
| Dynamic geometries | Static connectivity information Dynamic geometry information | MPEG-SC3DMC standard MPEG-FAMC standard |

In Table 1, the MPEG-BBA standard is described in M Preda, F Preteux, Critic review on MPEG-4 face and body animation. Proceedings of the International Conference on Image Processing (ICIP '02), September 2002, Rochester, N.Y., USA 3, 505-508, the MPEG-FAMC standard is described in K. Mamou, T. Zaharia, F. Preteux, TFAN: A Low Complexity 3D Mesh Compression Algorithm Computer Animation and Virtual Worlds (2009) and the MPEG-SC3DMC standard is described in K. Mamou, T. Zaharia, F. Preteux, N. Stefanoski, Frame-based compression of animated meshes in MPEG-4. IEEE Conference on Multimedia and Expo (2008), each of which is incorporated herein by reference as if fully set forth.

Figure 3:
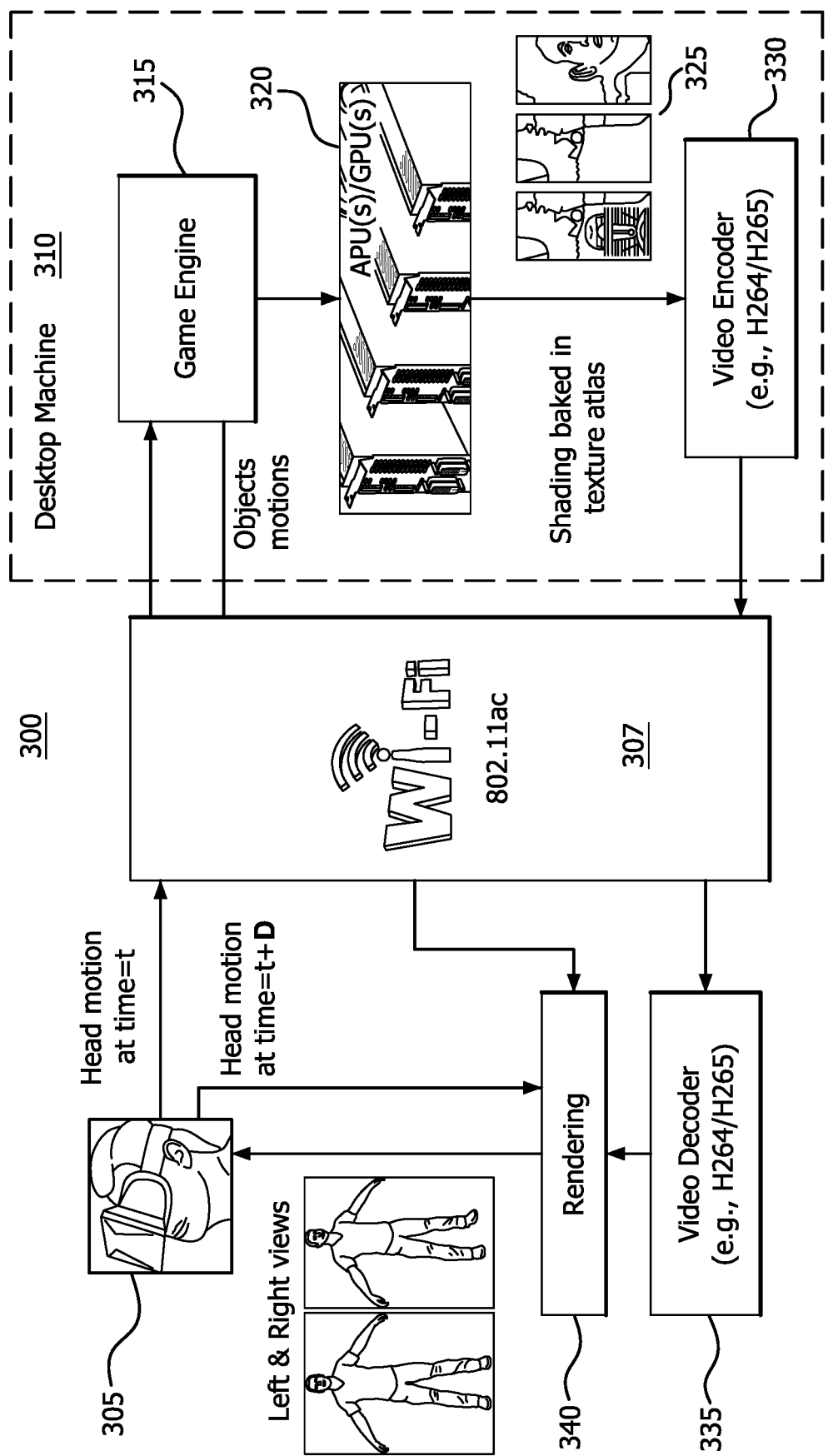
FIG. 3 is a block diagram of a wireless VR system in accordance with certain embodiments.

The third information component is the shading information. The shading information is computed and baked on the server side as a set of 2D textures as shown in FIG. 3. Each 2D texture is associated with a sub-object or patch of the scene. The human visual system is less sensitive to how often the shading information is updated. In fact, 20 frames per second (fps), (approximately 50 milliseconds), seems to ensure a "good" quality user experience. The shading information is however significant and needs to be compressed efficiently in order to be streamed over the wireless network, while meeting the stringent latency and bandwidth requirements associated with VR applications. This efficiency may be based on using different compression techniques, pipelining, avoiding unnecessary rendering, compression or transmission, and/or scalable compression. Any of these techniques may be used solely or in combination with each other. The shading information latency is approximately 10-16 milliseconds. This information may be updated periodically. The period may be, for example, 60 milliseconds.

In certain embodiments, the shading information may use different techniques for compression. In an embodiment, the shading information may be compressed using traditional 2D image and video compression techniques, such as Joint Photographic Experts Group (JPEG), JPEG2000, Advanced Video Coding (AVC), High Efficiency Video Coding (HEVC), VP9 and the like.

In another embodiment, the shading information may be compressed using content-optimized compression techniques. In general, these techniques involve three phases: an offline phase, an online loading phase and an online interactive phase. During the offline phase, a given object is rendered from different camera viewpoints to generate a database of rendered textures. The rendered textures are analyzed in order to derive an optimal decomposition basis by exploiting Principal Component Analysis (PCA) or Singular Value Decomposition (SVD), for example. During the online loading phase, the basis functions are streamed to the HMD during the game/scene loading phase. Since this is done at initialization, there is no impact on latency. Finally, during the online interactive phase, a newly rendered texture is decomposed by exploiting the basis computed during the offline phase. Prediction, quantization and entropy encoding is then applied to the decomposition coefficients. The encoded decomposition coefficients are streamed to the client side and the bases functions streamed during the loading phase are exploited to decode the decomposition coefficients and reconstruct the rendered texture for presentation to the HMD.

In another embodiment, a combination of traditional image/video compression techniques with content-optimized compression techniques may be used. In this embodiment, a subset of the content optimized decomposition bases is used to decompose the signal, (e.g., use the 4 or 5 basis functions which concentrates the highest amount of the signal energy), and residual errors are compressed by using traditional image/video compression techniques.

In certain embodiments, pipelining may be used to reduce latency. For example, the rendering, compression, transmission, decoding, client side rendering and presentation may be pipelined on a patch or sub-object basis, (i.e., all the pipeline operations are applied independently to the textures associated with the patches or sub-objects).

In certain embodiments, techniques may be used to detect and/or avoid unnecessary rendering, compression or transmission. In an embodiment, a dependency graph may be maintained that describes for each object, which set of other objects in the scene need to be updated in order to trigger re-rendering. The decision of re-rendering the textures associated with an object may be made by analyzing which scene updates affect the objects compositing the dependency graph. In another embodiment, pre-analysis may be used. A low resolution version of each texture is computed and maintained on the server side. Every time a patch or sub-object is re-rendered, the low resolution version of the associated texture is computed first. The full resolution texture is rendered, compressed and transmitted only when the difference between the newly rendered low resolution version and the stored low resolution version is significant.

In certain embodiments, scalable compression may be used. In an embodiment, the textures resolution may be adjusted based on the size of the patches or sub-objects on the screen. In another embodiment, the textures resolution may be adjusted based on the importance accorded by the application, (e.g., give higher resolutions to the main player or enemies and relatively lower resolution to the background). In another embodiment, the textures update frequency, (frame rate), which may also be referred to as the shading information update rate, may be adjusted based on the importance accorded by the application, (e.g., give higher frame rates to the main player or enemies and relatively lower frame rates to the background).

FIG. 3 shows a wireless VR system 300 in accordance with certain embodiments that overcomes the limitations discussed previously by combining a texture-space rendering approach with efficient low latency compression as discussed above. As discussed, scene content from the wireless VR system 300 is decoupled into three information components and each information component is then encoded and streamed differently.

The wireless VR system 300 is in a client-server configuration and includes a 3D display device, for example, a HMD 305 that is in wireless communication with a server 310, such as a desktop machine, using a wireless communication protocol 307. The wireless communication protocol 307 may use any number of wireless communication standards or wireless network configurations such as WiFi and the like. In another embodiment, the communications in the client-server configuration may be wired communications. The server 310 may include a game engine 315 that sends commands to a processing system 320 to perform texture-space rendering operations and feeds/transmits updated object motion data to a video decoder 335. The server 310 and processing system 320 may include central processing units (CPUs), graphics processing units (GPUs), advanced processing units (APUs) and the like which are configured to store and transmit texture-space rendering information in accordance with the embodiments disclosed herein. In an embodiment, the server 310 and processing system 320 may be part of a cloud computing service, such as a collection of computing resources available over a network. The network may be wired, wireless or a combination thereof.

The processing system 320 performs texture-space rendering operations based on the received commands and outputs a texture atlas 325 with baked-in shading. A video encoder 330 compresses and encodes the texture atlas 325 for transmission as a bitstream to the video decoder 335. The video decoder 335 decodes the bitstream and feeds the decoded texture atlas 325 to a client-side rendering engine 340. The rendering engine 340 processes the decoded texture atlas 325 with updated head/camera motion from the HMD 305 and updated object motion data from the game engine 315. The left and right view outputs from the client-side rendering engine 340 are presented to the HMD 305.

As noted above, the wireless VR system 300 is generally in a client-server configuration. The client-side component may include the HMD 305, the client-side rendering engine 340 and the video decoder 335. In an embodiment, the HMD 305, the client-side rendering engine 340 and the video decoder 335 may be one device. In another embodiment, the client-side rendering engine 340 and the video decoder 335 may be in a device in communications with the HMD 305. In the embodiment, the devices may include at least a GPU, APU, central processing unit (CPU) and the like.

Figure 4:
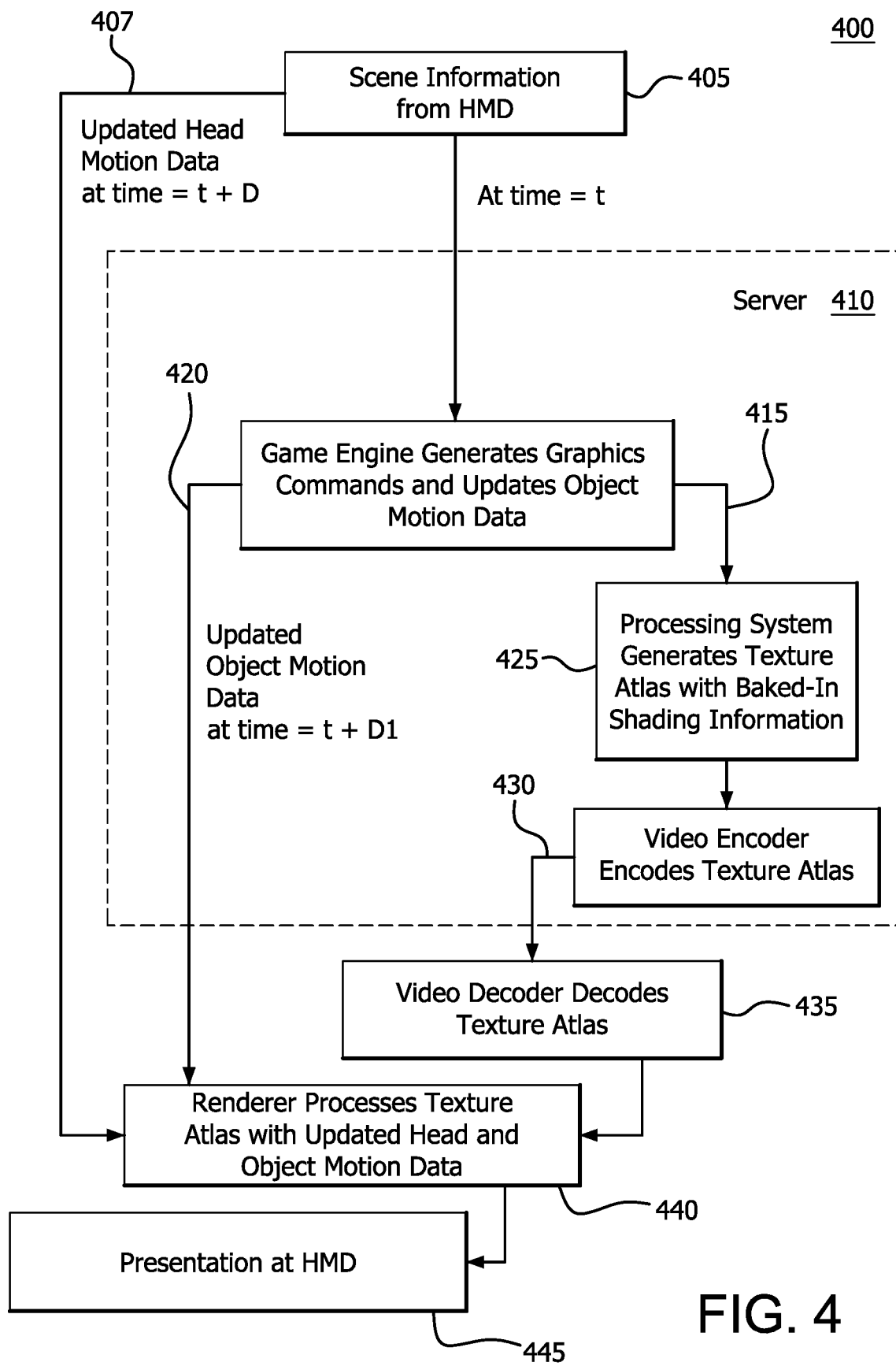
FIG. 4 is a flowchart for processing VR system content in accordance with certain embodiments.

FIG. 4 is a flowchart 400 for implementing a method for texture-space rendering on a wireless VR system in accordance with certain embodiments. At a time t, the HMD transmits scene information to a server 410 (405) and sends updated head and/or camera motion every D milliseconds using the techniques described above (407). A game engine processes the scene information to generate texture-space commands that are sent to a processing system (415) and transmits updated object motion data to a client-side renderer using the techniques described above (420). The object motion data may be updated every D1 milliseconds.

The processing system generates/renders a texture atlas with baked-in shading information based on the scene information and sends the texture atlas to a video encoder (425). The video encoder encodes the texture atlas and the server transmits the encoded image/bitstream to a video decoder according to the techniques described above (430). The video decoder decodes the encoded texture atlas according to the techniques described above (435). The renderer processes the decoded texture data with the updated head/camera motion and object motion data (440) and sends it to the HMD for presentation (445). As noted above, the server-side rendering, encoding, decoding and client-side rendering may be done on a patch level.

Although the embodiments described herein are directed to wireless VII systems, the method and system may be applicable to other environments, such as for example, but not limited to, augmented reality (AR). In an AR system, a live view of a physical, real-world environment is augmented by computer-generated sensory input such as sound, video, graphics, global positioning system (GPS) and other similar data. For purposes of illustration, a 3D object may be imposed on a video playing on the AR system. Suitable platforms for AR system may include smartphones and tablet computers, for example.

Figure 5:
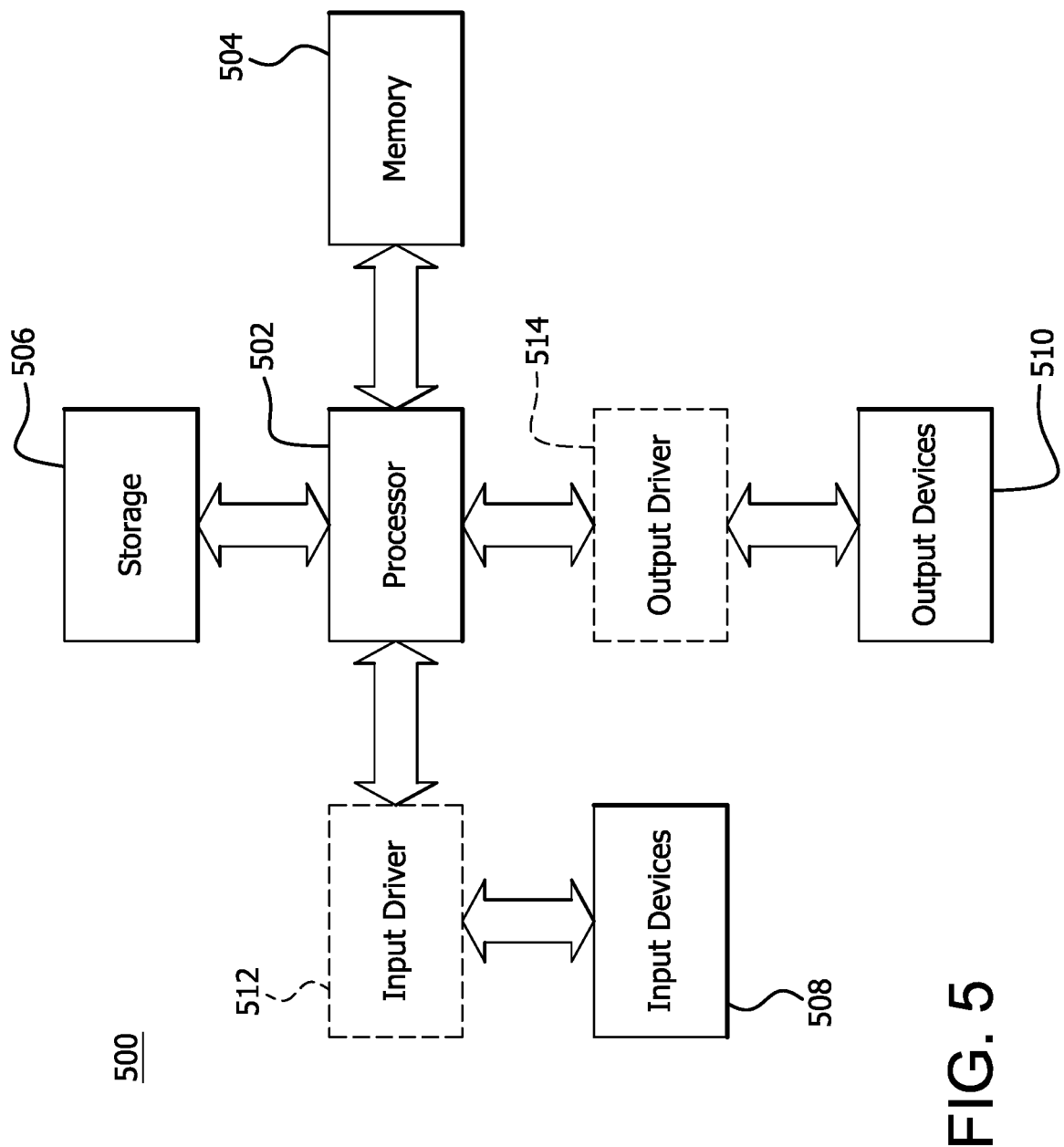
FIG. 5 is a block diagram of an example device in which one or more disclosed embodiments may be implemented.

FIG. 5 is a block diagram of an example device 500 in which one or more portions of one or more disclosed embodiments may be implemented. The device 500 may include, for example, a head mounted device, a server, a computer, a gaming device, a handheld device, a set-top box, a television, a mobile phone, or a tablet computer. The device 500 includes a processor 502, a memory 504, a storage 506, one or more input devices 508, and one or more output devices 510. The device 500 may also optionally include an input driver 512 and an output driver 514. It is understood that the device 500 may include additional components not shown in FIG. 51.

The processor 502 may include a central processing unit (CPU), a graphics processing unit (GPU), a CPU and GPU located on the same die, or one or more processor cores, wherein each processor core may be a CPU or a GPU. The memory 504 may be located on the same die as the processor 502, or may be located separately from the processor 502. The memory 504 may include a volatile or non-volatile memory, for example, random access memory (RAM), dynamic RAM, or a cache.

The storage 506 may include a fixed or removable storage, for example, a hard disk drive, a solid state drive, an optical disk, or a flash drive. The input devices 508 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 510 may include a display, a speaker, a printer, a haptic feedback device, one or more lights, an antenna, or a network connection (e.g., a wireless local area network card for transmission and/or reception of wireless IEEE 802 signals).

The input driver 512 communicates with the processor 502 and the input devices 508, and permits the processor 502 to receive input from the input devices 508. The output driver 514 communicates with the processor 502 and the output devices 510, and permits the processor 502 to send output to the output devices 510. It is noted that the input driver 512 and the output driver 514 are optional components, and that the device 500 will operate in the same manner if the input driver 512 and the output driver 514 are not present.

In general and without limiting embodiments described herein, a computer readable non-transitory medium including instructions which when executed in a processing system cause the processing system to execute a method for texture-space rendering.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for use in a server for 3D rendering and streaming in wireless virtual reality, the method comprising:
   receiving, from a client device, head/camera motion information, object motion information, and shading information;
   generating, using a game engine, updated object motion information and graphics operations commands;
   texture-space rendering by processing the graphics operations commands, the head/camera motion information, the object motion information, and the shading information to generate a texture atlas with baked-in shading information; and
   transmitting the texture atlas with baked-in shading information and the updated object motion information to the client device, the texture atlas with baked-in shading information for use in generating a view at the client device,
   wherein latency periods associated with receiving the object motion information, the shading information, and the head/camera motion information are different.

2. The method of claim 1, further comprising:
   encoding the updated object motion information using a first compression protocol; and
   encoding the texture atlas with baked-in shading information using a second compression protocol.

3. The method of claim 2, further comprising:
   receiving updated head/camera motion information using a real-time transmission protocol.

4. The method of claim 1, wherein a latency period associated with receiving head/camera motion information is lower than a latency period associated with receiving object motion information and the latency period associated with receiving object motion information is lower than a latency period associated with receiving shading information.

5. The method of claim 1, wherein the head/camera motion information, the object motion information and the shading information each have different update rates.

6. The method of claim 5, wherein a head/camera motion information update rate is faster than an object motion information update rate and the object motion information update rate is faster than a shading information update rate.

7. The method of claim 1, wherein the texture-space rendering and rendering is done at a patch level.

8. The method of claim 7, wherein shading operations forego rendering by reusing the baked-in shading information in the texture atlas.

9. The method of claim 1, wherein the server transmits the texture atlas with baked-in shading information to multiple client-side renderers.

10. The method of claim 1, further comprising:
    compressing the texture atlas with baked-in shading information using image and video compression protocols, content-optimized compression protocols, scalable compression based on patch size and combinations thereof.

11. The method of claim 1, further comprising:
    maintaining a dependency graph to forego unnecessary rendering, compression or transmission.

12. The method of claim 1, further comprising:
    comparing pre and post low resolution textures to forego unnecessary rendering, compression or transmission.

13. The method of claim 1, further comprising:
adjusting at least one of texture resolution based on patch size and shading information update rate based on scene importance.

14. A server for 3D rendering and streaming in wireless virtual reality comprising:
a receiver configured to receive head/camera motion information, object motion information, and shading information from a client device;
a game engine configured to generate updated object motion information and graphics operations commands;
a texture-space renderer configured to receive the graphics operations commands and apply the head/camera motion information, the object motion information and the shading information to generate a texture atlas with baked-in shading information; and
a transmitter configured to transmit the texture atlas with baked-in shading information and the updated object motion information to the client device, the texture atlas with baked-in shading information for use in generating a view at the client device,
wherein latency periods associated with receiving the object motion information, the shading information, and the head/camera motion are different.

15. The server of claim 14, further comprising:
an encoder configured to:
encode the updated object motion information using a first compression protocol; and
encode the texture atlas with baked-in shading information using a second compression protocol.

16. The server of claim 14, wherein the updated head/camera motion information is received using a real-time transmission protocol.

17. The server of claim 14, wherein a latency period associated with receiving head/camera motion information is lower than a latency period associated with receiving object motion information and the latency period associated with receiving object motion information is lower than a latency period associated with receiving shading information.

18. The server of claim 14, wherein the head/camera motion information, the object motion information and the shading information each have different update rates.

19. The server of claim 18, wherein a head/camera motion information update rate is faster than an object motion information update rate and the object motion information update rate is faster than a shading information update rate.

20. The server of claim 14, wherein the texture-space renderer is configured to render at a patch level.

21. The server of claim 20, wherein the baked-in shading information in the texture atlas is reused to forego shading operations.

22. The server of claim 14, wherein the server is configured to transmit the texture atlas with baked-in shading information to multiple client-side renderers.

23. The server of claim 14, further comprising:
an encoder configured to compress the texture atlas with baked-in shading information using image and video compression protocols, content-optimized compression protocols, scalable compression based on patch size and combinations thereof.

24. The server of claim 14, further comprising:
the server configured to maintain a dependency graph to forego unnecessary rendering, compression or transmission, compare pre and post low resolution textures to forego unnecessary rendering, compression or transmission, or adjust at least one of texture resolution based on patch size and shading information update rate based on scene importance.

25. A non-transitory computer readable medium including instructions which, when executed by a processing system having a processing capability, cause the processing system to execute instructions for use in a server for 3D rendering and streaming in wireless virtual reality, the instructions causing the processing system to perform operations comprising:
receiving, from a client device, head/camera motion information, object motion information, and shading information;
generating, using a game engine, updated object motion information and graphics operations commands;
texture-space rendering by processing the graphics operations commands the head/camera motion information, the object motion information and the shading information to generate a texture atlas with baked-in shading information; and
transmitting, the texture atlas with baked-in shading information and the updated object motion information to the client device, the texture atlas with baked-in shading information for use in generating a view at the client device,
wherein latency periods associated with receiving the object motion information, the shading information and the head/camera motion information are different.

* * * * *